United States Patent
Felton et al.

(10) Patent No.: US 10,575,457 B2
(45) Date of Patent: Mar. 3, 2020

(54) COMMODITY METERING SYSTEM WITH SPEED COMPENSATION BASED ON MACHINE TILT AND METHODS FOR OPERATING THE SAME

(71) Applicant: Deere & Company, Moline, IL (US)

(72) Inventors: Keith L. Felton, Sherrard, IL (US); Elijah B. Garner, Bettendorf, IA (US); Stanley R. Borkgren, Geneseo, IL (US)

(73) Assignee: DEERE & COMPANY, Moline, IL (US)

( * ) Notice: Subject to any disclaimer, the term of this patent is extended or adjusted under 35 U.S.C. 154(b) by 218 days.

(21) Appl. No.: 15/711,764

(22) Filed: Sep. 21, 2017

(65) Prior Publication Data

US 2019/0082585 A1 Mar. 21, 2019

(51) Int. Cl.
A01C 7/10 (2006.01)
A01C 7/12 (2006.01)
G01C 9/06 (2006.01)

(52) U.S. Cl.
CPC .............. *A01C 7/102* (2013.01); *A01C 7/127* (2013.01); *G01C 9/06* (2013.01)

(58) Field of Classification Search
CPC ......... A01C 7/102; A01C 7/081; A01C 7/127; G01C 9/06
USPC ........................................................... 701/36
See application file for complete search history.

(56) References Cited

U.S. PATENT DOCUMENTS

| | | | |
|---|---|---|---|
| 4,216,730 A * | 8/1980 | Noble | A01B 49/06 111/138 |
| 4,896,615 A | 1/1990 | Hood, Jr. et al. | |
| 5,684,476 A | 11/1997 | Anderson | |
| 5,845,818 A | 12/1998 | Gregor et al. | |
| 8,132,521 B2 | 3/2012 | Snipes et al. | |
| 8,281,724 B2 | 10/2012 | Snipes | |
| 8,434,416 B2 | 5/2013 | Kowalchuk et al. | |
| 8,678,347 B2 | 3/2014 | Maro | |
| 9,591,799 B2 | 3/2017 | Henry | |
| 2009/0090283 A1* | 4/2009 | Riewerts | A01C 7/102 111/184 |

(Continued)

FOREIGN PATENT DOCUMENTS

| | | |
|---|---|---|
| DE | 2843487 A1 | 4/1980 |
| DE | 102012111144 A1 | 5/2014 |
| EP | 0278251 A1 | 8/1988 |

OTHER PUBLICATIONS

New Holland, Product Calibration Procedures, 5 Working Operations Excerpt, undated admitted art.

(Continued)

*Primary Examiner* — Krishnan Ramesh
(74) *Attorney, Agent, or Firm* — Klintworth & Rozenblat IP LLP (57) ABSTRACT

A method of operating a volumetric metering system for a work vehicle includes detecting, with a sensor as the work vehicle moves, a tilt condition of the volumetric metering system relative to a reference horizontal plane. The method also includes generating, by a processor, a control command for a metering element based, at least partly, on the detected tilt condition. Furthermore, the method includes varying an actuation speed of the metering element according to the control command. A system for this method is also disclosed.

20 Claims, 5 Drawing Sheets

(56) References Cited

U.S. PATENT DOCUMENTS

2013/0340610 A1    12/2013  Maro
2014/0209000 A1*   7/2014   Henry .................... A01C 7/042
                                                      111/174
2016/0120097 A1*   5/2016   Chahley ............... G05D 7/0617
                                                       701/50

OTHER PUBLICATIONS

John Deere, 1910 Air Cart Hydraulic Drive Meter Calibration, http://www.youtube.com/wath?v=yNC-cYSZDva, Dec. 13, 2012.
German search report for application No. 102018214065 dated May 23, 2019.

* cited by examiner

FIG. 6

COMMODITY METERING SYSTEM WITH SPEED COMPENSATION BASED ON MACHINE TILT AND METHODS FOR OPERATING THE SAME

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles and implements, and more specifically, to a commodity metering system for a work vehicle with speed compensation based on machine tilt and methods for operating the same.

BACKGROUND OF THE DISCLOSURE

Work vehicles, such as air seeders and other seeding devices, are configured for applying seed, fertilizer, and/or other particulate commodities to a field. The work vehicle may also include tilling equipment for applying the commodity under the surface of the soil.

Work vehicles typically include one or more tanks and a metering system that meters out a predetermined quantity of the commodity from the tank as the work vehicle moves across the field. The metered particles move into a high velocity airstream generated by an airflow system of the vehicle. Once in the airstream, the particles are delivered to the soil.

SUMMARY OF THE DISCLOSURE

This disclosure provides an improved metering system and methods for operating a metering element by automatically adjusting the speed of the element based, at least partly, on a detected slope of the terrain.

In one aspect, the disclosure provides a method of operating a volumetric metering system for a work vehicle. The method includes detecting, with a sensor as the work vehicle moves, a tilt condition of the volumetric metering system relative to a reference horizontal plane. The method also includes generating, by a processor, a control command for a metering element based, at least partly, on the detected tilt condition. Furthermore, the method includes varying an actuation speed of the metering element according to the control command.

In another aspect, a volumetric metering system for a work vehicle is disclosed. The system includes a commodity container and a metering element configured to actuate at a speed to meter a commodity out from the commodity container. The speed is variable. The system further includes a sensor configured to detect a tilt condition of the volumetric metering system relative to a reference horizontal plane. The system additionally includes a control system configured to generate a control command for the metering element based, at least partly, on the tilt condition detected by the sensor. The control system is configured to vary the speed of the metering element according to the control command.

In an additional aspect, the disclosure provides a method of operating a volumetric metering system for a work vehicle. The metering system including a rotatable metering element. The method includes receiving user input relating to a commodity type and a target application rate. The method also includes detecting, with a sensor as the work vehicle moves, a tilt condition of the volumetric metering system relative to a reference horizontal plane. The method further includes accessing a memory element that includes a plurality of stored datasets that correlate tilt conditions, target speeds of the metering element, and application rates. Also, the method includes identifying one of the plurality of datasets that applies for the commodity type. Moreover, the method includes generating, by a processor, a control command for the metering element according to the identified one of the plurality of datasets based, at least partly, on the detected tilt condition and the target application rate. The method additionally includes varying an angular rotation speed of the metering element according to the control command.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of a seed metering system for a seeding machine, such as an air cart, its seeding system, control system(s), and the methods for operating the same, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

As used herein, the term "module" refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicle described herein is merely one exemplary embodiment of the present disclosure.

Conventional techniques related to signal processing, data transmission, signaling, control, and other functional aspects of the systems (and the individual operating components of the systems) may not be described in detail herein for brevity. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As will be appreciated by one skilled in the art, certain aspects of the disclosed subject matter may be embodied as a method, system, or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that may contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Aspects of certain embodiments are described herein may be described with reference to flowchart illustrations and/or block diagrams of methods, apparatus (systems) and computer program products according to embodiments of the invention. It will be understood that each block of any such flowchart illustrations and/or block diagrams, and combinations of blocks in such flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block (or otherwise described herein) may occur out of the order noted in the figures. For example, two blocks shown in succession (or two operations described in succession) may, in fact, be executed substantially concurrently, or the blocks (or operations) may sometimes be executed in the reverse order, depending upon the functionality involved. It will also be noted that each block of any block diagram and/or flowchart illustration, and combinations of blocks in any block diagrams and/or flowchart illustrations, may be implemented by special purpose hardware-based systems that perform the specified functions or acts, or combinations of special purpose hardware and computer instructions.

The following describes one or more example implementations of the disclosed work vehicle for metering and delivering a commodity to the soil, as shown in the accompanying figures of the drawings described briefly above. Generally, the disclosed work vehicle includes a metering system (e.g., a volumetric metering system) that accurately meters out a commodity from a storage tank as the work vehicle moves across the terrain. The slope (i.e., incline or decline) of the terrain and/or the tilt (positive or negative pitch and/or roll) of the work vehicle/metering system relative to a reference horizontal plane is detected during operation, and a control system controls the metering system based on the detected inclination. For example, the speed of a metering implement may be controlled based on the detected incline. Accordingly, the work vehicle provides the desired application rate (e.g., the amount of commodity mass per acre of terrain).

In some embodiments, the metering system includes a metering implement, such as a roller. The system may also include an actuator that rotates the roller to meter out a predetermined and measured amount of the commodity through the system. The speed of the metering implement is controlled by a control system. The control system automatically compensates for the slope of the terrain on which the work vehicle is travelling. Accordingly, metering methods and systems of the present disclosure provide improved seeding operations during agricultural work.

Figure 1:
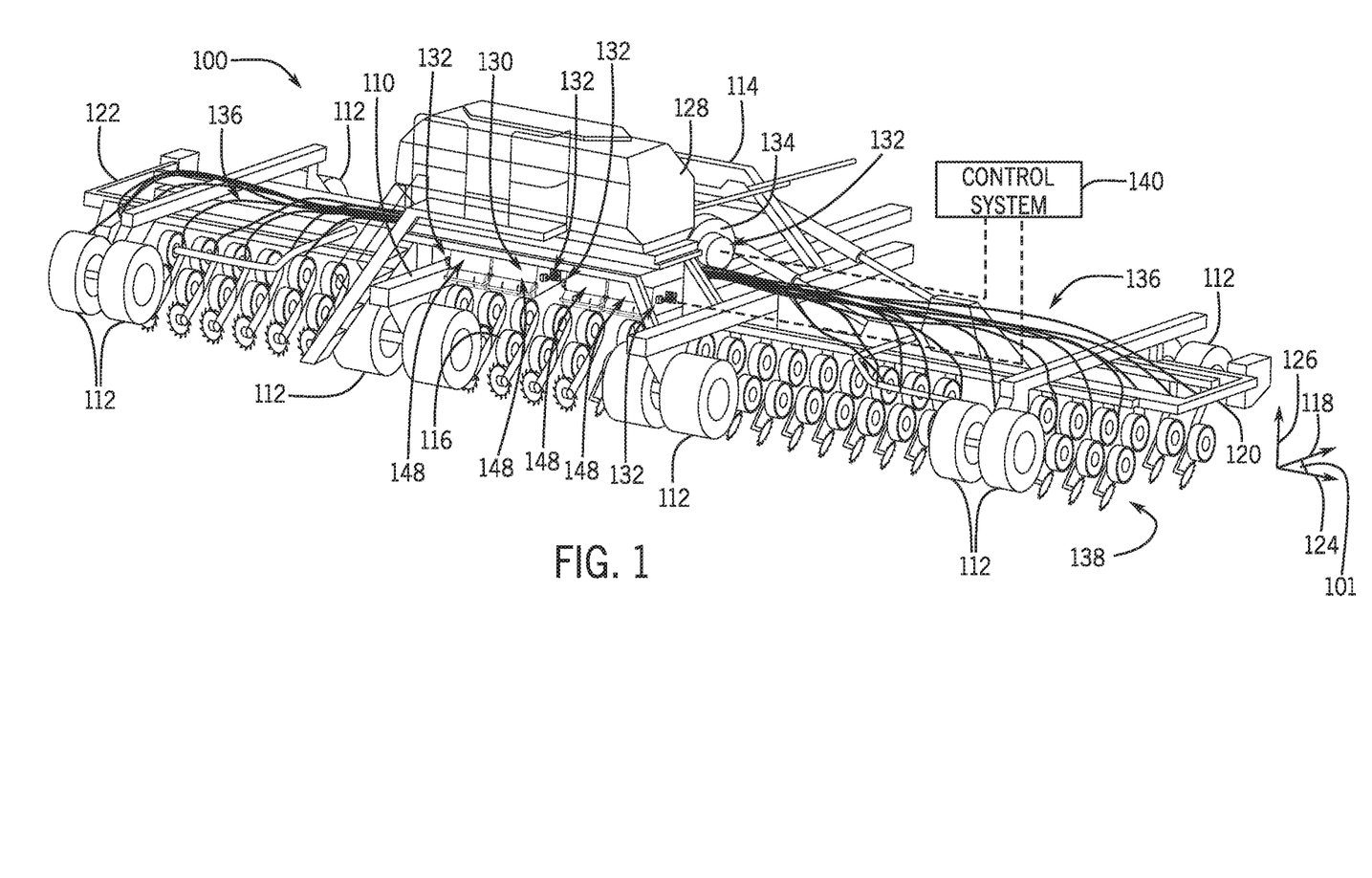
FIG. 1 is a rear perspective view of a work vehicle according to example embodiments of the present disclosure.

FIG. 1 illustrates a work vehicle 100 according to example embodiments of the present disclosure. The work vehicle 100 may be towed by another vehicle, such as a tractor. Thus, the work vehicle 100 may be a towed work vehicle. In other embodiments, the work vehicle 100 of the present disclosure may be a self-propelled vehicle. In some embodiments, the work vehicle 100 may be an air cart or air drill. It will be appreciated that the illustrated work vehicle 100 is an example embodiment. One or more features of the present disclosure may be included on a different work vehicle, such as a planter, a commodity cart, or other work vehicle without departing from the scope of the present disclosure.

The work vehicle 100 includes a front end 114 and a rear end 116. The work vehicle 100 also includes a first side 120 and a second side 122. Generally, the work vehicle 100 may include a chassis 110 and a plurality of wheels 112. The chassis 110 may be a rigid or flexible frame that supports the components described in detail below. The wheels 112 may support the chassis 110 on terrain and enable movement of the vehicle 100 across the terrain.

A travelling direction 118 is indicated in FIG. 1 for reference purposes. It will be appreciated that a fore-aft axis of the work vehicle 100 (extending between the front end 114 and rear end 116) is parallel to the travelling direction 118. A lateral direction 124 is also indicated in FIG. 1, and it will be appreciated that a lateral axis of the work vehicle 100 (extending between the first side 120 and the second side 122) is parallel to the lateral direction 124. Furthermore, a vertical direction 126 is indicated in FIG. 1 for reference purposes.

Figure 3:
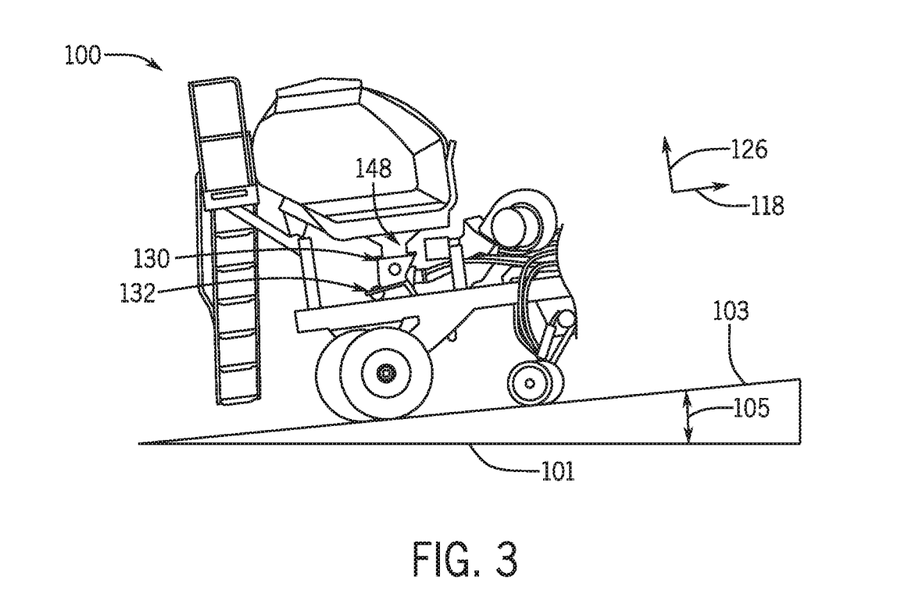
FIG. 3 is a side view of the work vehicle of FIG. 1 shown on fore-aft inclined terrain imparting a pitch tilt to the work vehicle.
Figure 4:
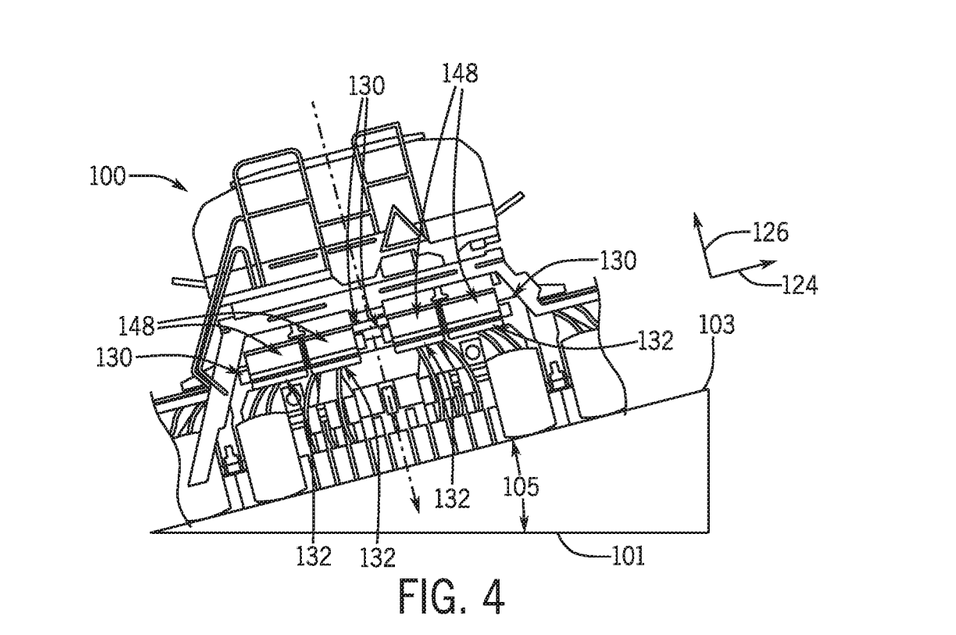
FIG. 4 is a rear view of the work vehicle of FIG. 1 shown on side-sloping inclined terrain imparting a roll tilt to the work vehicle.

In addition, a reference horizontal plane 101 is indicated in FIG. 1. The wheels 112 may support the vehicle 100 on the horizontal plane 101. In other words, the work vehicle 100 may travel across terrain that lies within the horizontal plane 101. The work vehicle 100 may also travel along inclined or sloped terrain. As represented in FIG. 3, the work vehicle 100 may travel along a sloped terrain 103 that is disposed at an angle 105 relative to the horizontal plane 101 in the fore-aft direction. For example, as represented in FIG. 3, the work vehicle 100 may travel uphill or downhill on the terrain 103 to impart a pitch tilt to the work vehicle 100. Also, as represented in FIG. 4, the work vehicle 100 may travel on a side-slope (i.e., a laterally inclined terrain 103) to impart a roll tilt to the work vehicle 100 such that the first side 120 and the second side 122 are disposed at different elevations relative to the horizontal plane 101. Although not shown, the work vehicle 100 may also travel over terrain imparting various combinations of pitch and roll tilt.

Figure 2:
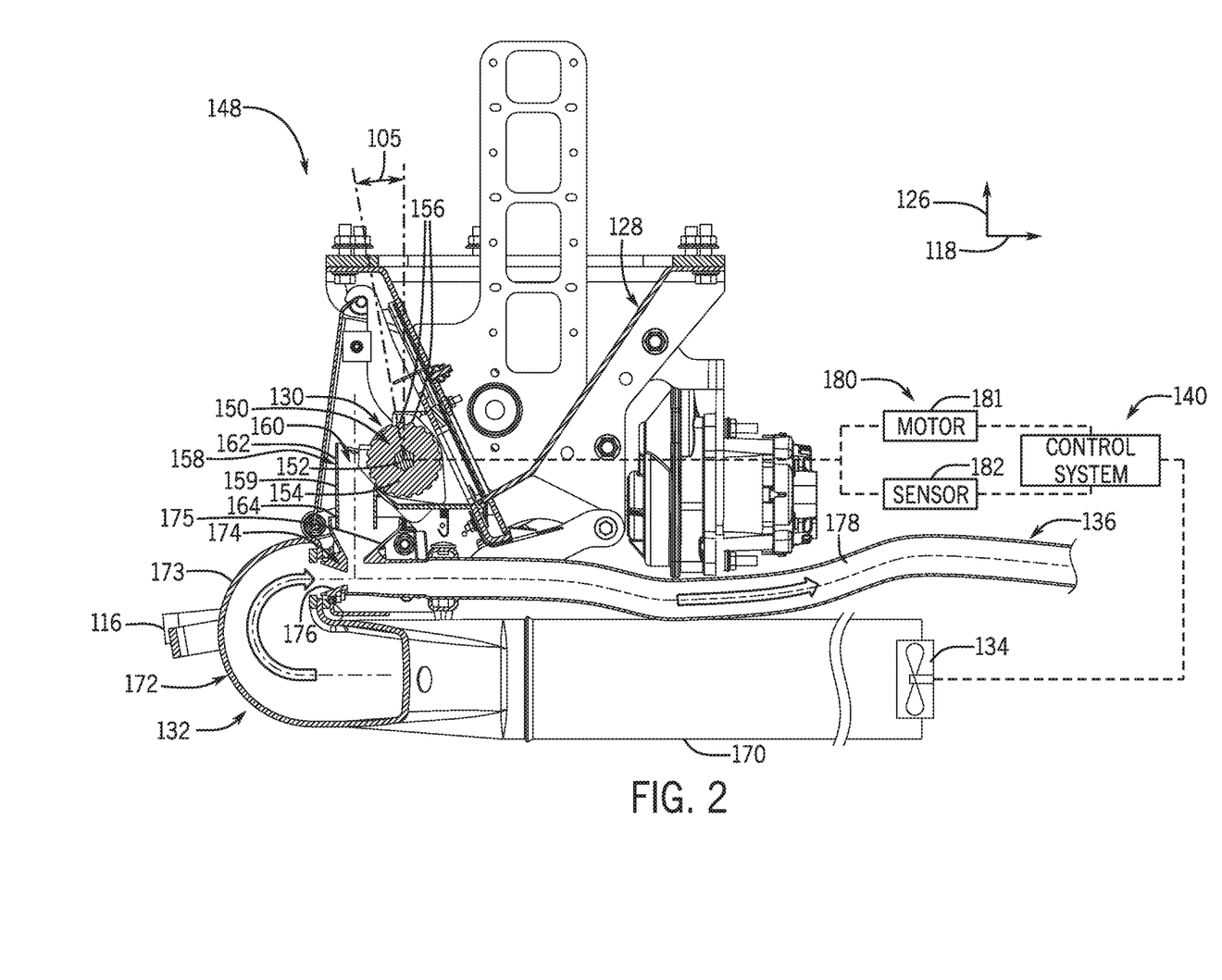
FIG. 2 is a section view of a metering system and an airflow system of the work vehicle of FIG. 1.

As shown in FIGS. 1 and 2, the work vehicle 100 may include one or more commodity containers 128. The container 128 may be supported on the chassis 110 and disposed proximate the rear end 116. Also, in some embodiments, the container 128 may be disposed centrally between the first side 120 and the second side 122. The commodity container 128 may contain seed, fertilizer, and/or another particulate or granular commodity.

Additionally, the work vehicle 100 may include at least one metering system 130. The metering system 130 may be a volumetric metering system. The metering system 130 may be disposed generally underneath the commodity container 128 in some embodiments. As such, particles of the commodity within the container 128 may fall due to gravity toward the metering system 130. The metering system 130 may operate to meter out the commodity from the container 128 at a controlled rate as the vehicle 100 moves across the field.

The work vehicle 100 may also include an airflow system 132. The airflow system 132 may include a fan 134 that generates a flow of air. The airflow system 132 may also include a plurality of airflow structures (e.g., plenums, tubes, lines, etc.) that receive the air blowing from the fan 134. Particles of the commodity (metered out by the metering system 130) may fall into the air stream and may flow to a distribution system 136. As shown in FIG. 1, the distribution system 136 may include a plurality of hoses, lines, or other conduits that extend to different areas of the vehicle 100 along the lateral direction 124. The particles of the commodity may be propelled by the airstream through the distribution system 136 toward the soil. The work vehicle 100 may also include a ground system 138 with openers, tillers or other similar implements that prepare the soil for delivery of the seed, fertilizer, or other commodity delivered by the distribution system 136.

Moreover, the work vehicle 100 may include a control system 140. The control system 140 may be in communication with and may be configured for controlling the metering system 130, the airflow system 132, and/or other components of the work vehicle 100. The control system 140 may be wholly supported on the work vehicle 100, or the control system 140 may include components that are remote from the vehicle 100. The control system 140 may be in electronic, hydraulic, pneumatic, mechanical, or other communication with the metering system 130, the airflow system 132, etc. In some embodiments, the control system 140 may be in communication with actuators, sensors, and/or other components of the work vehicle 100.

During operation of the work vehicle 100 (e.g., when towed by a tractor or other towing vehicle across a field), the commodity may fall from the container 128 toward the metering system 130. The control system 140 may control the metering system 130 (e.g., by controlled actuation of a motor or other actuator), which allows a controlled quantity of particles to pass into the airflow system 132 at a predetermined rate. The control system 140 may also control the fan 134 for generating a continuous airstream that blows through the airflow system 132, receives the particles metered out from the metering system 130, and flows through the distribution system 136 across the work vehicle 100 to the soil.

In some embodiments, the metering system 130, the airflow system 132, the control system 140, and/or other parts of the work vehicle 100 may include features disclosed in U.S. patent application Ser. No. 15/670,834, filed Aug. 7, 2017, and entitled "WORK VEHICLE WITH COMMODITY METERING SYSTEM AND AIRFLOW SYSTEM", the entire disclosure of which is incorporated by reference.

Referring now to FIG. 2, the metering system 130, the airflow system 132, and the control system 140 will be discussed in greater detail according to example embodiments. A central assembly 148 of the work vehicle 100 is shown. The central assembly 148 may be supported on the chassis 110, proximate the rear end 116 of the vehicle 100. Also, in some embodiments, the central assembly 148 may define portions of the commodity container 128, the metering system 130, and/or the airflow system 132. As shown in FIG. 1, the work vehicle 100 may include plural central assemblies 148 that include a respective metering system 130 and/or respective components of an airflow system 132. For example, there may be four central assemblies 148 arranged end-to-end laterally across the work vehicle 100.

In some embodiments, the metering system 130 may be a volumetric metering system. However, the metering system 130 may be of a different configuration without departing from the scope of the present disclosure.

As shown, the metering system 130 may include a metering element 150. In some embodiments, the metering element 150 may be a rotatable metering element 150 that provides volumetric metering. The metering element 150 may be referred to as a roller or a roller cartridge. In some embodiments, the work vehicle 100 may include a rotatable metering element 150 for each of the central assemblies 148. Thus, in the embodiment shown in FIG. 1, there may be four rotatable metering elements 150 arranged laterally end-to-end across the work vehicle 100.

As shown in FIG. 2, the rotatable metering element 150 may include a shaft 152. The shaft 152 may have a relatively straight axis that extends laterally. The metering element 150 may also include a plurality of wheels 154 that are supported on the shaft 152. The wheels 154 may be spaced apart laterally along the shaft 152. The wheels 154 may include a plurality of projections 156 that project radially away from the wheel 154. Although the metering element 150 is shown as a roller in FIG. 2, the metering element 150 could also be configured as an auger in some embodiments of the present disclosure.

Furthermore, the metering system 130 may further include a plurality of commodity tubes 158. The commodity tubes 158 may be referred to as commodity cups. As an example, the commodity tube 158 may include a plurality of side walls 159 that define a passage 160. The passage 160 may have an open first end 162 and an open second end 164. The first end 162 of the commodity tube 158 may be disposed proximate the metering element 150 for receiving the commodity. The work vehicle 100 may include a plurality of commodity tubes 158, arranged along the lateral direction 124 across the work vehicle 100 and arranged along the axis of the rotatable metering element 150.

Thus, during operation of the metering system 130, the metering element 150 may rotate about the axis of the shaft 152. Commodity from the container 128 may fall onto the wheels 154 of the metering element 150. As the metering element 150 rotates, the commodity may fall from the wheels 154 and into the passages 160 of the commodity tubes 158. The commodity may fall through the passages 160 and exit the commodity tubes 158 through the second ends 164.

With continued reference to FIG. 2, the airflow system 132 will be discussed in greater detail. As mentioned above, the airflow system 132 may include a fan 134 that generates the airflow. The airflow system 132 may also include at least one upstream duct structure 170 that is fluidly connected to the fan 134 to receive airflow therefrom.

The airflow system 132 may further include at least one plenum assembly 172. In some embodiments, the work vehicle 100 may include a plenum assembly 172 for each central assembly 148. Thus, in the embodiment shown in FIG. 1, there may be four plenum assemblies 172.

The plenum assembly 172 may include a plenum 173, which is fluidly connected to the upstream duct structure 170 to receive airflow therefrom. The plenum 173 may define a curved passage that directs air from the fan 134, which is blowing rearward, and turns the air forward.

The plenum assembly 172 may further include a plurality of venturi structures 174, one of which is represented in FIG. 2. The work vehicle 100 may include a plurality of venturi structures 174, arranged along the lateral direction 124 across the work vehicle 100 and along the axis of the rotatable metering element 150. There may be a venturi structure 174 for each commodity tube 158 in some embodiments.

As an example, the venturi structure 174 may include a funnel portion 175 that is disposed proximate the second end 164 of the respective commodity tube 158. The venturi structure 174 may also include at least one venturi tube 176. The venturi tube 176 may be fluidly connected to the funnel portion 175. Furthermore, an upstream end of the venturi tube 176 may be fluidly connected to the plenum 173. A downstream end of the venturi tube 176 may be fluidly connected to a tube 178 of the distribution system 136.

Accordingly, particles of the commodity that have been metered out by the metering system 130 may fall into the funnel portion 175 and into the venturi tube 176 of the venturi structure 174. The commodity may enter the air stream generated by the fan 134 and directed forward by the plenum 173. The commodity may accelerate through the tube 178 of the distribution system 136 and may be ultimately delivered to the soil.

With continued reference to FIG. 2, the control system 140 of the work vehicle will be discussed. The control system 140 may include and/or communicate with components of a computerized device, such as a processor, a data storage device, a user interface with a display and a keyboard or other related devices, etc. The control system 140 may communicate with an actuator 180. In some embodiments, the actuator 180 may be operably connected to the metering system 130 for driving (e.g., rotating) the metering element 150. The actuator 180 may be of any suitable type, such as an electric motor 181 in some embodiments. However, it will be appreciated that the actuator 180 may be a hydraulic actuator (e.g., a hydraulic motor) or another type without departing from the scope of the present disclosure. Accordingly, during operation, the work vehicle 100 may be towed across a field at some speed (i.e., a ground speed). The control system 140 may generate control signals for operating the electric motor 181 of the metering element 150 at a controlled speed. The speed of the motor 181 may be controlled based, at least partly, on the ground speed of the vehicle 100. The speed of the motor 181 may also be controlled based, at least partly, on the conditions (e.g., slope) of the terrain as will be discussed. Furthermore, the speed of the motor 181 may be controlled based on the type of commodity (e.g., seed type) that is being used and/or based on other factors. As such, the metering element 150 may meter out a predetermined amount of the commodity from the commodity container 128.

Also, in some embodiments, the control system 140 may be in communication with the fan 134 for controlling the airflow system 132. In additional embodiments, the control system 140 may be in communication with a powertrain, transmission, or other similar system for moving the work vehicle 100 across the terrain. For example, if the work vehicle 100 is self-propelled, the control system 140 may communicate with an engine system, a transmission, etc. Otherwise, the control system 140 may communicate with a tractor or other vehicle towing the work vehicle 100 of FIG. 1. It will be appreciated that the control system 140 may be in communication with and may control other systems as well.

The control system 140 may be in communication with one or more sensors 182 (i.e., a sensor system). The sensor(s) may be configured to detect one or more conditions associated with operations of the work vehicle 100.

In some embodiments, one or more sensors 182 may detect the speed (e.g., an angular speed) of the actuator 180 and/or the metering element 150. Such a sensor 182 may comprise an optical sensor, an electrical sensor, or other type without departing from the scope of the present disclosure. Accordingly, in some embodiments, the control system 140 may control the motor 181 and receive associated feedback from the sensor 182 for closed-loop control of the metering element 150.

Additionally, in some embodiments, one or more sensors 182 may be configured for detecting a tilt condition of the metering system 130. In some embodiments, the sensor(s) 182 may detect a tilt condition of the work vehicle 100 as it moves across the terrain, and this tilt condition of the work vehicle 100 is utilized as a detected tilt condition of the metering system 130. In additional embodiments, the sensor 182 may detect a tilt condition of one or more components of the metering system 130 directly, without regard to the inclination of other parts of the work vehicle 100.

In some embodiments, the sensor 182 may detect a tilt condition associated with uphill, downhill, and/or side sloping travel of the vehicle 100 on the terrain. The sensor 182 may continuously sense and output updated signals indicative of the current tilt condition of the vehicle 100. As indicated in FIGS. 2, 3, and 4, the sensor 182 may detect an inclination angle 105 (i.e., angular orientation, slope angle, etc.) of the work vehicle 100 relative to the reference horizontal plane 101 as the detected tilt condition.

It will be appreciated that the slope of the terrain may affect how the commodity moves from the container 128 and through the metering system 130. For example, gravity can move the commodity relative to the metering element 150. However, the control system 140 may generate a control command for the metering element 150 based, at least partly, on the tilt condition detected by the sensor 182. For example, the control system 140 may generate and send control commands to the motor 181 based on the tilt condition detected by the sensor 182. In some embodiments, the control system 140 may vary the angular speed of the metering element 150 (i.e., either speed up rotation or reduce the speed of the metering element 150 based on the detected tilt condition). Moreover, in some embodiments in which plural metering systems 130 of the work vehicle 100 can be independently controlled, the control system 140 may provide different motor commands to the different metering elements 150 of the work vehicle 100. For example, the control system 140 may provide a first motor command for controlling and varying a speed of a first metering element 150, and the control system 140 may also provide a second motor command for controlling and varying a speed of a second metering element 150. Thus, the different metering elements 150 may be operated at different speeds based, at least in part, on the detected tilt condition of the work vehicle 100.

At least one sensor 182 may be configured as an inclinometer and/or may include an accelerometer. The sensor 182 may sense a parameter associated with the inclination angle 105 and provide an output signal indicative of the inclination angle 105 to the control system 140. In FIG. 3, the reference plane 101 is horizontal, and the work vehicle 100 is shown travelling uphill and forward along the travel direction 118. The sensor 182 may detect the inclination angle 105 as the vehicle 100 travels uphill. It will be appreciated that the sensor 182 may also detect the inclination angle 105 as the vehicle 100 travels downhill. This uphill/downhill travel is also represented in FIG. 2, although the inclination angle 105 is indicated with respect to a vertical axis that extends through the axis of rotation of the metering element 150. Moreover, in the illustrated embodiment of FIG. 4, the reference plane 101 is horizontal, the work vehicle 100 is shown travelling along a side slope, and the sensor 182 may detect the inclination angle 105 as the vehicle 100 travels. In additional embodiments, the sensor 182 may detect a combination of fore-aft and side-to-side tilt conditions.

Figure 5:
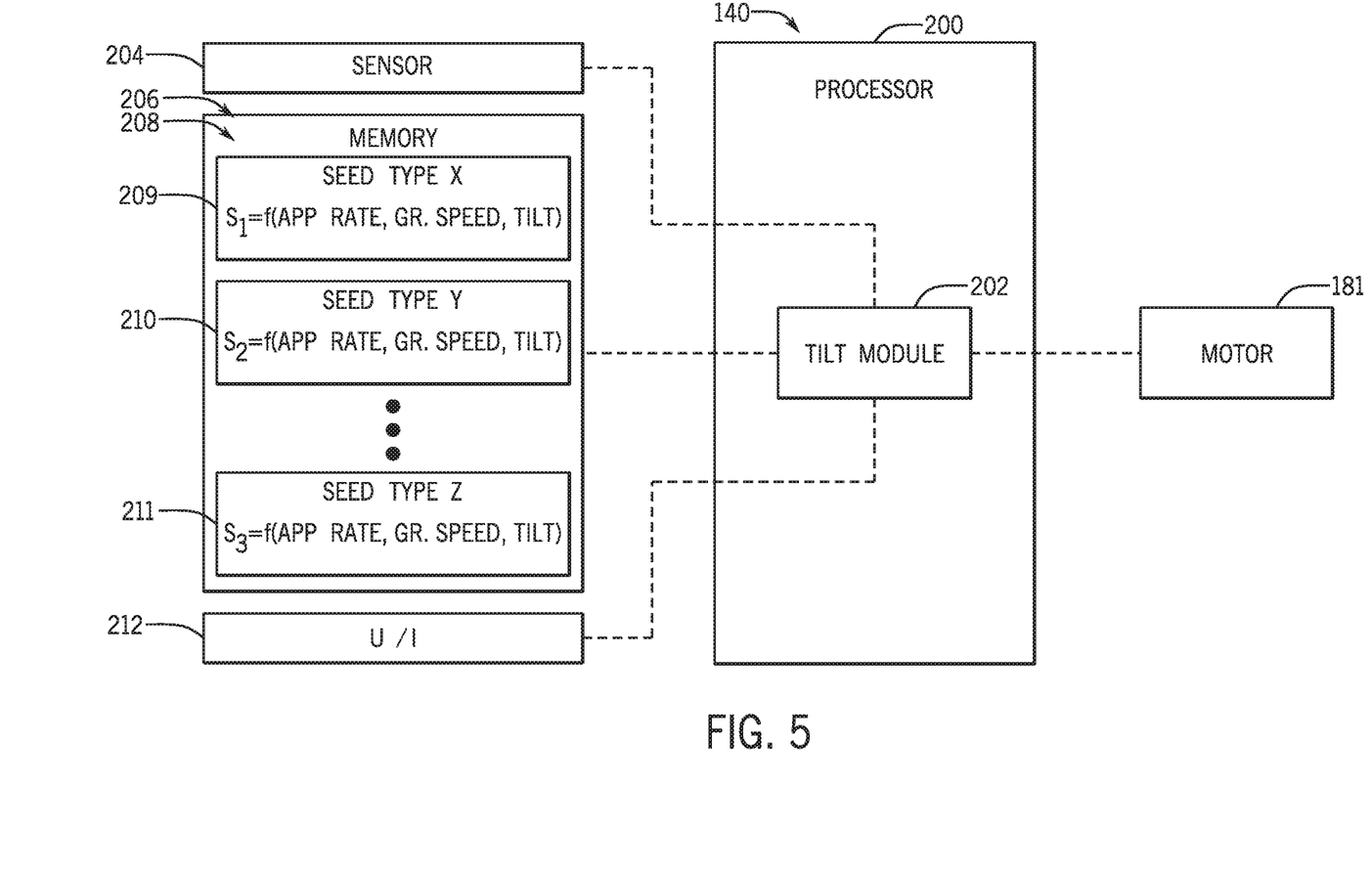
FIG. 5 is a data flow diagram of a control system of the work vehicle of FIG. according to example embodiments.

The control system 140 is shown in more detail in FIG. 5 according to example embodiments. It will be understood that FIG. 5 is a simplified representation of the control system 140 for purposes of explanation and ease of description, and FIG. 5 is not intended to limit the application or scope of the subject matter in any way. Practical embodiments of the control system 140 may vary from the illustrated embodiment without departing from the scope of the present disclosure. Also, the control system 140 may include numerous other devices and components for providing additional functions and features, as will be appreciated in the art.

The control system 140 may include a processor 200. The processor 200 may comprise hardware, software, and/or firmware components configured to enable communications and/or interaction between the sensor(s) 204, the motor 181, a memory element 206, and a user interface (U/I) 212. The processor 200 may also perform additional tasks and/or functions described in greater detail below. Depending on the embodiment, the processor 200 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processor 200 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processor 200 includes processing logic that may be configured to carry out the functions, techniques, and processing tasks associated with the operation of the control system 140. Furthermore, the steps of a method or algorithm described in connection with the embodiments disclosed herein may be embodied directly in hardware, in firmware, in a software module executed by the processor 200, or in any practical combination thereof.

The processor 200 may have a tilt module 202, which is configured to determine the tilt condition of the work vehicle 100. The tilt module 202 may also be configured for processing, generating, and outputting motor control commands to the motor 181 based on the determined tilt condition and other conditions. As shown, the tilt module 202 may be in communication with the sensor 204 for receiving a signal corresponding to the current inclination angle 105. The tilt module 202 may also be in communication with the memory element 206 and the U/I 212 for receiving input therefrom. Based on these communications with the sensor 204, the memory element 206, and the U/I 212, the tilt module 202 may generate and output motor control commands for the electric motor 181. The motor 181 may operate according to these control commands. More specifically, the motor 181 may rotate the metering element 150 in accordance with the control commands from the tilt module 202.

The memory element 206 may be realized as RAM memory, flash memory, EPROM memory, EEPROM memory, registers, a hard disk, a removable disk, a CD-ROM, or any other form of storage medium known in the art. In this regard, the memory element 206 can be coupled to the processor 200 such that the processor 200 can read information from, and write information to, the memory element 206. In the alternative, the memory element 206 may be integral to the processor 200. As an example, the processor 200 and the memory element 206 may reside in an ASIC.

In some embodiments, the memory element 206 may include a plurality of datasets 208. In some embodiments, the plurality of datasets 208 may include a first dataset 209, a second dataset 210, and a third dataset 211. However, it will be appreciated that there may be any number of datasets 208. The datasets 208 may include a plurality of correlated variables. In other words, the datasets 208 may express a predetermined correlation between several variables, such as commodity-type, desired application rate for the commodity-type, the ground speed of the vehicle 100, the tilt condition of the vehicle 100, and/or the angular speed of the metering element 150. In some embodiments, the datasets 208 include stored mathematical functions, calibration curves, look-up tables, or other tools. The datasets 208 may be created and saved, pregenerated, compiled, etc., from testing data, from user programming of the control system 140, or otherwise.

As will be discussed, the tilt module 202 of the processor 200 may rely on at least one of the datasets 208 to ultimately determine how fast to rotate the metering element 150 during planting, seeding, or related operations. More specifically, the tilt module 202 may determine the angular speed of the metering element 150 based on: (a) the inclination angle 105 detected by the sensor 204; (b) the commodity-type being metered by the metering system 130; (c) the desired application rate for the commodity; and/or (d) the ground speed of the vehicle 100.

Different types of commodities can vary in particulate size, flow, and/or other characteristics. Thus, in the embodiment of FIG. 5, there can be different datasets 208 for different commodity types. For example, the first dataset 209 may represent and/or be associated with a first commodity type, X. As shown, the first dataset 209 may express the angular speed, S1, of the metering element 150 as a function of the desired application rate, the ground speed, and the tilt condition (e.g., the inclination angle 105) detected by the sensor 204. The second dataset 210 may similarly express the angular speed, S2, of the metering element 150 for a second commodity type, Y. Also, the third dataset 211 may express the angular speed S3, of the metering element 150 for a third commodity type, Z. It will be appreciated that the memory element 206 may include datasets 208 for additional commodity types as well. Also, the datasets 208 may correlate the parameters (angular speed, application rate, ground speed, and tilt) in a variety of ways without departing from the scope of the present disclosure.

The U/I 212 may be of any suitable type. In some embodiments, the U/I 212 may include one or more input devices with which the user may enter user commands. For example, in some embodiments, the U/I 212 may include a keyboard, a mouse, a touch-sensitive surface, a stylus, and/or another input device. The U/I 212 may also include one or more output devices for providing output to the user. In some embodiments, the U/I 212 may include a display, a printer, an audio speaker, a tactile feedback device, or the like. Accordingly, with the U/I 212, the user may input the seed type that is loaded within the commodity container 128 and/or the desired application rate (e.g., measured in pounds of commodity per acre) for that particular commodity. The U/I 212 may also output a message, alert, or other information to the user regarding operating of the metering system 130.

Figure 6:
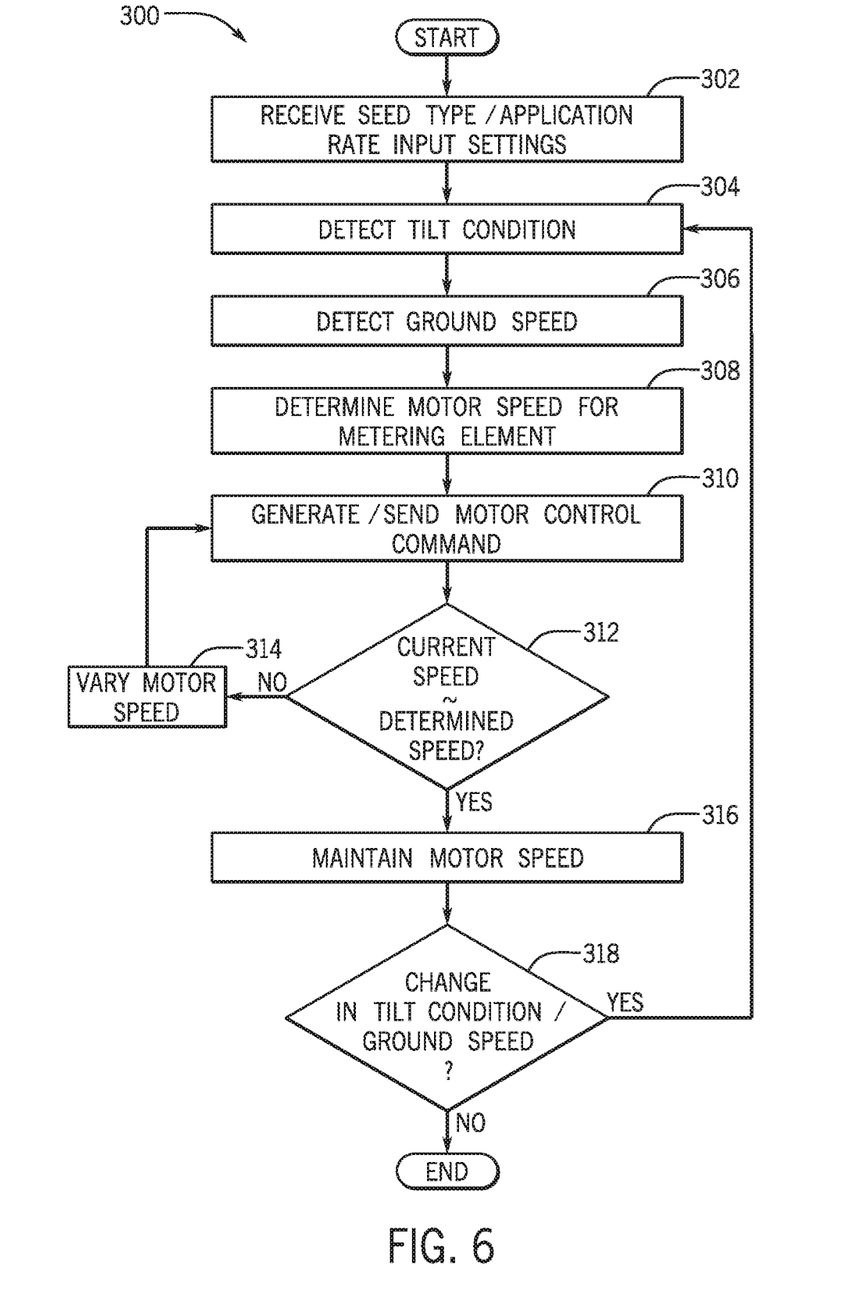
FIG. 6 is a flow chart illustrating a method of operating the work vehicle of FIG. according to example embodiments.

Referring now to FIG. 6, a method 300 of operating the metering system 130 will be discussed according to example embodiments. It will be appreciated that the method 300 may be utilized for performing a seeding, fertilizing, or other related operation. The method 300 may begin at 302, wherein the user prepares for the operation. Specifically, using the U/I 212, the user may input the commodity-type, the desired application rate, and/or other parameters for the operation. The tilt module 202 of the processor 200 may receive these inputs for processing as will be discussed.

Then, assuming that the operation has begun and the vehicle 100 is moving across the terrain, the method 300 may continue at 304, and the sensor 204 may detect the tilt condition of the vehicle 100. For example, the sensor 204 may detect the inclination angle 105 of the vehicle 100 relative to the reference horizontal plane 101. The sensor 204 may communicate a corresponding signal to the tilt module 202 of the processor 200. Also, at 306 of the method 300, the sensor 204 or other component may detect the current ground speed of the vehicle 100 and provide a corresponding signal to the tilt module 202 of the processor 200.

At 308, the tilt module 202 may determine an angular speed for the motor 181 of the metering element 150 based on the inputs received at 302, 304, and 306 of the method 300. For example, the processor 200 may access the memory element 206 to make the determination. In some embodiments, for example, the processor 200 may identify the dataset 208 for the commodity-type entered at 302. Using the identified dataset 208, the processor 200 may determine a target angular speed for the metering element 150, based on the inclination angle 105 detected at 304 and the ground speed detected at 306 for providing the desired application rate entered at 302. Then, at 310, the tilt module 202 may generate motor control commands for rotating the metering element 150 at the target angular speed determined at 308.

Next, the processor 200 may determine, at 312, whether the current speed is approximately equal to the target speed determined at 308. The processor 200 may make this determination according to output from the sensor 204. If not, then at 314, the control system 140 may vary the speed of the motor 181 to vary the angular speed of the metering element 150. Specifically, the method 300 may loop back to 310 wherein the processor 200 generates and sends motor control commands for speeding up or slowing down rotation of the metering element 150.

When, at 312, the processor 200 determines that the current speed of the metering element 150 is approximately equal to the speed determined at 308, the method 300 may continue at 316. At 316, the control system 140 may maintain the current speed of the motor 181. Next, at 318, the processor 200 may determine whether there is a significant change in the tilt condition from that detected at 304 and/or a significant change in ground speed for the vehicle 100. If so, the method 300 may loop back to 304 so that the inclination angle 105 may be again be detected; then to 306 where the ground speed may be detected again; and then to 308 where the processor 200 accesses the memory element 206 and determines a new angular speed for the metering element 150.

The method may continue as described above and the speed of the metering element 150 may be continuously controlled (e.g., closed-loop control), maintaining the speed of the metering element 150 at the target speed. Assuming that there are no more changes in tilt condition and/or ground speed (i.e., decision block 318 answered negatively), the method 300 may terminate.

In some embodiments, the speed of the metering element 150 may be controlled for maintaining the desired application rate even when the vehicle travels uphill. For example, the vehicle 100 may be travelling on substantially horizontal terrain (e.g., within the reference plane 101) and the control system 140 may run the metering element 150 at a first speed. Subsequently, the vehicle 100 may begin to travel uphill (as represented in FIGS. 2 and 3). The sensor 204 may detect the inclination angle 105 exceeds a predetermined threshold. As a result, in some embodiments, the control system 140 may reduce the angular speed of the metering element 150 from the first speed to maintain the desired application rate of the commodity.

Likewise, the speed of the metering element 150 may be controlled for maintaining the desired application rate when travelling downhill. For example, in some embodiments, the sensor 204 may detect the inclination angle 105 indicating downhill travel, and as a result, the control system 140 may reduce the angular speed of the metering element 150.

Additionally, the control system 140 may be configured for independently controlling speed of the individual metering elements 150. For example, the sensor 204 may detect that the vehicle 100 is travelling along a side-slope (FIG. 4). Accordingly, the control system 140 may rotate the metering elements 150 at different speeds from each other. Accordingly, the control system 140 may maintain the desired application rate of the commodity.

Furthermore, in some embodiments, the tilt conditions of different metering elements 150 of the work vehicle 100 may independently detected (e.g., at 304 of the method 300). Then, the control system 140 may generate individual control commands (e.g., at 310 of the method 300) for the individual metering elements 150 according to the tilt conditions detected for the different metering elements 150. Accordingly, the control system 140 may rotate the metering elements 150 at different speeds from each other and maintain the desired application rate.

Accordingly, the metering system 130 and the method 300 of operation may allow the work vehicle 100 to provide a substantially consistent application rate of the commodity. Also, the system 130 and method 300 may be substantially automated to provide convenience for the user.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A method of operating a volumetric metering system for a work vehicle, the method comprising:
   detecting, with a sensor as the work vehicle moves, a tilt condition of the volumetric metering system relative to a reference horizontal plane;
   generating, by a processor, a control command for a metering element based, at least partly, on the detected tilt condition; and
   varying an actuation speed of the metering element according to the control command.

2. The method of claim 1, wherein varying the actuation speed includes varying an angular rotation speed of the metering element according to the control command.

3. The method of claim 1, wherein the metering element is a first metering element, and wherein the work vehicle includes a second metering element;
   further comprising generating a first control command for the first metering element and a second control command for the second metering element based, at least partly, on the detected tilt condition;

further comprising varying a first speed of the first metering element according to the first control command; and further comprising varying a second speed of the second metering element according to the second control command.

4. The method of claim 1, wherein the metering element is a first metering element, and wherein the work vehicle includes a second metering element;

wherein detecting the tilt condition of the volumetric metering system includes detecting a first tilt condition of the first metering element and detecting a second tilt condition of the second metering element; and further comprising generating a first control command for the first metering element based, at least partly, on the detected first tilt condition;

further comprising generating a second control command for the second metering element based, at least partly, on the detected second tilt condition;

further comprising varying a first speed of the first metering element according to the first control command; and further comprising varying a second speed of the second metering element according to the second control command.

5. The method of claim 1, further comprising accessing, by the processor, a memory element with a plurality of stored datasets, the datasets correlating tilt conditions and respective target speeds of the metering element;

further comprising identifying an applicable one of the plurality of stored datasets; and wherein generating the control command includes generating the control command based, at least partly, on the one of the plurality of stored datasets.

6. The method of claim 1, further comprising receiving, by the processor, a user input; and wherein generating the control command includes generating the control command based on the detected tilt condition and the user input.

7. The method of claim 6, wherein the user input relates to a commodity type;

further comprising accessing, by the processor, a memory element with a plurality of stored datasets, the datasets correlating tilt conditions and target speeds of the metering element for the commodity type;

further comprising identifying one of the plurality of datasets for the commodity type; and wherein generating the control command includes generating the control command based, at least partly, on the one of the plurality of stored datasets and the detected tilt condition.

8. The method of claim 7, wherein the user input relates to the commodity type and to a target application rate;

wherein the datasets correlate tilt conditions, target speeds of the metering element, and application rates for the commodity type; and wherein generating the control command includes generating the control command based, at least partly, on the one of the plurality of stored datasets, the detected tilt condition, and the target application rate.

9. A volumetric metering system for a work vehicle comprising:

a commodity container;

a metering element configured to actuate at a speed to meter a commodity out from the commodity container, the speed being variable;

a sensor configured to detect a tilt condition of the volumetric metering system relative to a reference horizontal plane; and a control system configured to generate a control command for the metering element based, at least partly, on the tilt condition detected by the sensor, the control system configured to vary the speed of the metering element according to the control command.

10. The metering system of claim 9, wherein the metering element is a rotatable metering element supported for rotation about an axis; and wherein the control system is configured to vary an angular rotation speed of the rotatable metering element according to the control command.

11. The metering system of claim 9, wherein the metering element is a rotatable metering element configured to rotate about an axis;

wherein the rotatable metering element includes a plurality of projections that project outward from a roller in a radial direction.

12. The metering system of claim 9, wherein the sensor includes an inclinometer with an accelerometer.

13. The metering system of claim 9, further comprising a motor configured to rotate the metering element; and wherein the control system is configured to generate motor control commands for varying an angular speed of the metering element at a predetermined acceleration.

14. The metering system of claim 13, wherein the motor is one of an electric motor and a hydraulic motor.

15. The metering system of claim 9, further comprising a memory element configured to store a plurality of datasets, the datasets correlating tilt conditions and respective target speeds of the metering element;

wherein the control system is configured to identify an applicable one of the plurality of stored datasets; and wherein the control system is configured to generate the control command based, at least partly, on the one of the plurality of stored datasets.

16. The metering system of claim 9, wherein the metering element is a first metering element, and wherein the work vehicle includes a second metering element;

wherein the control system is configured to:

generate a first control command for the first metering element and a second control command for the second metering element based, at least partly, on the detected tilt condition;

vary a first speed of the first metering element according to the first control command; and vary a second speed of the second metering element according to the second control command.

17. The metering system of claim 9, wherein the metering element is a first metering element, and wherein the work vehicle includes a second metering element;

wherein the sensor is a first sensor configured to detect a first tilt condition of the first metering element relative to the reference horizontal plane;

further comprising a second sensor configured to detect a second tilt condition of the second metering element relative to the reference horizontal plane;

wherein the control system is configured to:

generate a first control command for the first metering element based, at least partly, on the detected first tilt condition;

generate a second control command for the second metering element based, at least partly, on the detected second tilt condition;

vary a first speed of the first metering element according to the first control command; and vary a second speed of the second metering element according to the second control command.

18. The metering system of claim 9, further comprising a user interface;

wherein the control system is configured to receive, via the user interface, a user input; and wherein the control system is configured to generate the control command based on the detected tilt condition and the user input.

19. The metering system of claim 18, wherein the user interface is configured for inputting a user input relating to a commodity type;

wherein the control system is configured to access a memory element with a plurality of stored datasets, the datasets correlating tilt conditions and target speeds of the metering element for the commodity type;

wherein the control system is configured to identify one of the plurality of datasets for the commodity type; and wherein the control system is configured to generate the control command based, at least partly, on the one of the plurality of stored datasets and the detected tilt condition.

20. A method of operating a volumetric metering system for a work vehicle, the metering system including a rotatable metering element, the method comprising:

receiving user input relating to a commodity type and a target application rate;

detecting, with a sensor as the work vehicle moves, a tilt condition of the volumetric metering system relative to a reference horizontal plane;

accessing a memory element that includes a plurality of stored datasets that correlate tilt conditions, target speeds of the metering element, and application rates;

identifying one of the plurality of datasets that applies for the commodity type;

generating, by a processor, a control command for the metering element according to the identified one of the plurality of datasets based, at least partly, on the detected tilt condition and the target application rate; and varying an angular speed of the metering element according to the control command.

* * * * *